(12) United States Patent
Love et al.

(10) Patent No.: US 9,175,645 B2
(45) Date of Patent: Nov. 3, 2015

(54) ELECTRO-PNEUMATIC ACTUATOR FOR A TURBOCHARGER WASTE GATE, AND A TURBOCHARGER AND A METHOD EMPLOYING SAME

(71) Applicant: Honeywell International Inc., Morristown, NJ (US)

(72) Inventors: Andrew Love, Nancy (FR); Julien Mailfert, Nancy (FR); Nicolas Devulder, Tokyo (JP)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/024,901

(22) Filed: Sep. 12, 2013

(65) Prior Publication Data

US 2015/0071758 A1    Mar. 12, 2015

(51) Int. Cl.
| | |
|---|---|
| *F02D 23/00* | (2006.01) |
| *F02B 33/44* | (2006.01) |
| *F02G 3/00* | (2006.01) |
| *F02M 25/07* | (2006.01) |
| *F02B 47/08* | (2006.01) |
| *F01D 17/10* | (2006.01) |
| *F02B 37/16* | (2006.01) |
| *F02B 37/18* | (2006.01) |

(52) U.S. Cl.
CPC ......... *F02M 25/0772* (2013.01); *F01D 17/105* (2013.01); *F02B 37/16* (2013.01); *F02B 37/183* (2013.01); *F02B 37/186* (2013.01); *F02B 47/08* (2013.01)

(58) Field of Classification Search
CPC .. F02B 37/183; F02B 37/186; F02D 41/0007; Y02T 10/144

USPC ............................................. 60/602, 605.1, 615
See application file for complete search history.

(56) References Cited

U.S. PATENT DOCUMENTS

| | | |
|---|---|---|
| 3,263,427 A | 8/1966 | Childs |
| 4,322,948 A | 4/1982 | Emmenthal |
| 4,449,367 A | 5/1984 | Moriguchi |
| 4,467,606 A | 8/1984 | Chaffiotte |
| 4,656,834 A | 4/1987 | Elpern |
| 4,942,852 A | 7/1990 | Richeson et al. |
| 5,152,145 A | 10/1992 | Miotke et al. |
| 5,270,625 A | 12/1993 | Neff |

(Continued)

FOREIGN PATENT DOCUMENTS

| | | |
|---|---|---|
| DE | 102007039218 A1 | 2/2009 |
| EP | 0035691 A1 | 9/1981 |

(Continued)

*Primary Examiner* — Audrey K Bradley
(74) *Attorney, Agent, or Firm* — John C. James

(57) ABSTRACT

An electro-pneumatic actuator for a waste gate includes an electric actuator to impart linear motion to an actuator shaft, and a pneumatic chamber defining a passage extending therethrough, the actuator shaft extending through the passage, the pneumatic chamber being sealed with respect to the actuator shaft. A piston is disposed in the pneumatic chamber and arranged for movement in the pneumatic chamber, the piston being affixed to the actuator shaft such that the actuator shaft and the piston move together as a unit. There is a port into the pneumatic chamber for feeding a gas into the pneumatic chamber or exhausting the gas therefrom so as to exert a pressure force on the piston and thereby provide a pneumatic assist to the force exerted on the actuator shaft.

13 Claims, 4 Drawing Sheets

(56) References Cited

U.S. PATENT DOCUMENTS

| | | |
|---|---|---|
| 6,018,949 A | 2/2000 | Brosecke |
| 8,166,755 B2 | 5/2012 | Jeanson et al. |
| 2013/0289850 A1* | 10/2013 | Johnson et al. ............... 701/104 |

FOREIGN PATENT DOCUMENTS

| | | | |
|---|---|---|---|
| FR | 2650860 A1 * | 2/1991 | ............ F01N 3/2006 |
| GB | 2054739 A | 2/1981 | |
| GB | 2172657 A | 9/1986 | |

* cited by examiner

ELECTRO-PNEUMATIC ACTUATOR FOR A TURBOCHARGER WASTE GATE, AND A TURBOCHARGER AND A METHOD EMPLOYING SAME

BACKGROUND OF THE INVENTION

The present disclosure relates generally to exhaust gas-driven turbochargers having a waste gate for bypassing exhaust gas around the turbine during certain operating conditions. The disclosure relates in particular to an electro-pneumatic actuator for effecting movement of the waste gate.

Recent increases in gasoline turbocharger performance requirements and stricter emission regulations have driven the need for waste gate actuation to move from pneumatic systems to electric systems for increased controllability, faster response time, and potentially reduced overall system costs. The difficulties associated with electric actuation are, among others, the need to over-size the electric motor because the motor is required to operate in a stall condition for extended periods of time in order to maintain the waste gate in a closed position against high loads. Typically in a continuous stall condition, an electric motor, because of internal heating of the motor coils, can provide less than half of its peak force. This means that there must be a significant over-sizing of the motor to ensure it has sufficient force in the stall condition, which results in large package size, increased weight, and unnecessary force surplus during more-favorable operating conditions.

BRIEF SUMMARY OF THE DISCLOSURE

The present disclosure concerns an electro-pneumatic actuator for a waste gate, which combines features of an electric actuator and features of a pneumatic actuator. The electric portion of the actuator is sized based on transient force or torque requirements rather the static force requirement in continuous stall. In addition, a flat pressure chamber is connected between the actuator shaft (in the case of a linear actuator) and the housing of the actuator. The pressure chamber comprises a piston/membrane assembly that is attached to the actuator shaft, and a cover with a fitting for the pressure entry. The pneumatic portion of the actuator provides the high static force needed for continuous stall conditions.

The pneumatic assist could be provided in three possible ways: (1) The pressure could be taken directly from the turbocharger compressor discharge (P2C), as this energy source is related to the amount of force required to move the waste gate valve. A simple tap on the compressor with a pneumatic hose would provide the P2C to the pneumatic assist. (2) An on-off valve could be placed before the port of the actuator (still using P2C as the energy source), and the pneumatic assist could be controlled by (a) a position signal from the electric actuator, so that pneumatic assist is provided for only certain parts of the stroke (near waste gate closing, for example), or (b) an external signal from the engine control unit could activate the pneumatic assist. (3) A modulating control valve could be used to control the pneumatic assist (again with P2C as the energy source), in which case an external signal would likely be required.

Thus, in accordance with one embodiment described herein, an electro-pneumatic actuator for a turbocharger waste gate comprises: an actuator shaft having a first end and a second end and defining an axis extending between the first and second ends, the second end being arranged for connection to the waste gate; an electric actuator coupled to the actuator shaft, the electric actuator being structured and arranged to exert a force on and impart linear motion to the actuator shaft substantially along a direction defined by the axis, for advancing and retracting the actuator shaft so as to adjust a position of the waste gate; a pneumatic chamber defining a passage extending therethrough, the actuator shaft extending through the passage, the pneumatic chamber being sealed with respect to the actuator shaft; a piston disposed in the pneumatic chamber and arranged for movement in the pneumatic chamber substantially along said direction, the piston being affixed to the actuator shaft such that the actuator shaft and the piston move together as a unit; and a port into the pneumatic chamber for feeding a gas into the pneumatic chamber or exhausting the gas therefrom so as to exert a pressure force on the piston and thereby provide a pneumatic assist to the force exerted on the actuator shaft.

In one embodiment, the piston includes a rigid disc portion rigidly affixed to the actuator shaft, the disc portion having an outer periphery, and a flexible diaphragm attached to the disc portion and having a peripheral portion that extends beyond the outer periphery of the disc portion and is sealingly attached to an inner surface of the pneumatic chamber. The piston divides the pneumatic chamber into a first sub-chamber and a second sub-chamber, and the port communicates with the second sub-chamber.

An on-off valve can be provided in communication with the port for selectively controlling the gas fed into or exhausted from the pneumatic chamber.

The electric actuator can be operable for providing a position signal indicative of a position of the actuator shaft with respect to end points of a full stroke of the actuator shaft, and the pneumatic assist can be provided for only certain parts of the stroke of the actuator shaft. For example, based on the position signal, the pneumatic assist can be provided only when the actuator shaft position is near the end point of the stroke corresponding to a closed position of the waste gate.

The on-off valve can be arranged for receiving an external signal from an engine control unit for activating the pneumatic assist.

Instead of an on-off valve, a modulating control valve can be provided in communication with the port for selectively controlling the gas fed into or exhausted from the pneumatic chamber.

The present disclosure also relates to a method for regulating a position of a waste gate of a turbocharger, comprising the steps of:

providing a turbocharger comprising a compressor and a turbine, the turbine having a turbine housing that receives exhaust gas from an internal combustion engine and supplies the exhaust gas to a turbine wheel that is connected to a compressor wheel of the compressor, the turbine further comprising a waste gate that in a closed position allows substantially all of the exhaust gas to pass through the turbine wheel and that in any of various open or partially open positions allows some of the exhaust gas to bypass the turbine wheel;

providing an actuator shaft having a first end and a second end and defining an axis extending between the first and second ends, the second end being connected to the waste gate;

using an electric actuator to impart movement to the actuator shaft substantially along the axis so as to move the waste gate from one of the open or partially open positions toward the closed position; and when the waste gate is in the closed position, exerting a pneumatic assist force on the actuator shaft to hold the waste gate in the closed position and deactivating the electric actuator.

In one embodiment, the pneumatic assist force is exerted by a pneumatic actuator coupled to the actuator shaft. The pneumatic actuator comprises a pneumatic chamber having a piston disposed therein, the piston being affixed to the actuator shaft, and a port defined in the pneumatic chamber for feeding a gas into the pneumatic chamber or exhausting the gas therefrom so as to exert a pressure force on the piston and thereby provide the pneumatic assist force exerted on the actuator shaft.

The method in some embodiments includes controlling the gas fed into or exhausted from the pneumatic chamber with an on-off valve in communication with the port.

In one embodiment, the electric actuator provides a position signal indicative of a position of the actuator shaft with respect to end points of a full stroke of the actuator shaft, and the pneumatic assist force is provided for only certain parts of the stroke of the actuator shaft.

For example, in one embodiment the pneumatic assist force is provided only when the position of the actuator shaft is within a predetermined tolerance of a position corresponding to the closed position of the waste gate.

The control of the on-off valve can be accomplished in different ways. In one embodiment, the on-off valve receives an external signal from an engine control unit for activating the pneumatic assist force.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The turbocharger and electro-pneumatic actuator now will be described more fully hereinafter with reference to the accompanying drawings in which some but not all possible embodiments are shown. Indeed, the turbocharger and electro-pneumatic actuator may be embodied in many different forms and should not be construed as limited to the embodiments set forth herein; rather, these embodiments are provided so that this disclosure will satisfy applicable legal requirements. Like numbers refer to like elements throughout.

Figure 1:
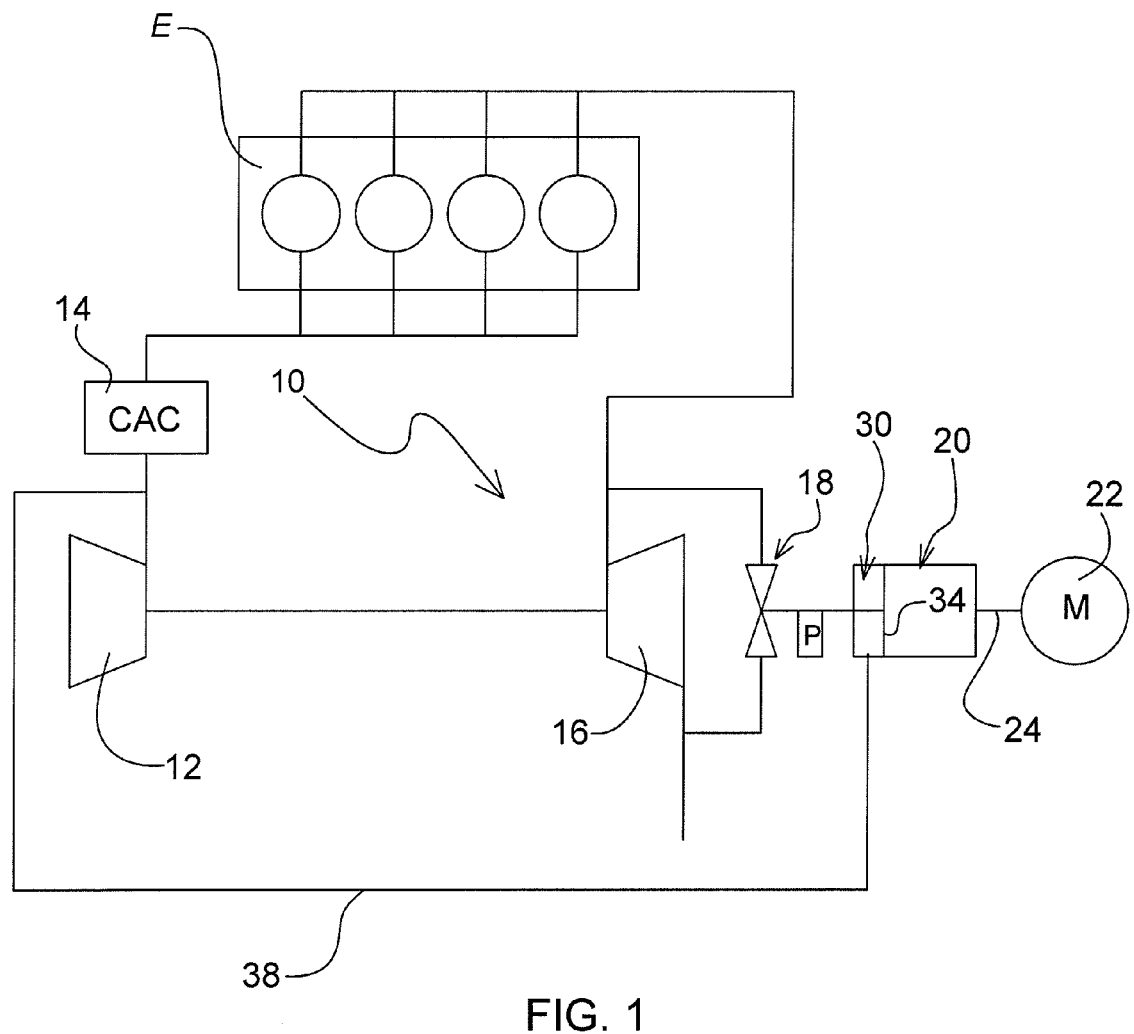
FIG. 1 is a schematic diagram of an internal combustion engine with a turbocharger in accordance with an embodiment of the invention.

FIG. 1 shows a turbocharger system 10 employing an electro-pneumatic actuator in accordance with an embodiment of the invention, coupled with an internal combustion engine E. The turbocharger 10 comprises a compressor 12 for compressing air for delivery to an intake of the engine E. The turbocharger system can include a charge air cooler (CAC) 14 for cooling the compressed air before delivery to the intake. The turbocharger also comprises a turbine 16 that receives exhaust gases from the exhaust manifold of the engine and rotatably drives the compressor. The turbocharger also includes a bypass valve or waste gate 18 that when open allows some of the exhaust gases from the engine to bypass the turbine, and when closed causes all of the exhaust gases to pass through the turbine.

The system 10 further comprises an electro-pneumatic actuator 20 coupled with the waste gate 18 for causing movement of the waste gate to open and close it. The electro-pneumatic actuator essentially comprises an electric motor 22 of either rotary or linear type, having an actuator shaft 24 that is moved linearly by the motor, and a pneumatic device 30 coupled with the actuator shaft 24 for providing a pneumatic assist force to the shaft under certain operating conditions. When the motor is a rotary motor, there is a suitable gear or transmission (not shown) for converting the rotary motion of the motor to linear motion of the actuator shaft 24, as well-known to those skilled in the art.

Figure 4:
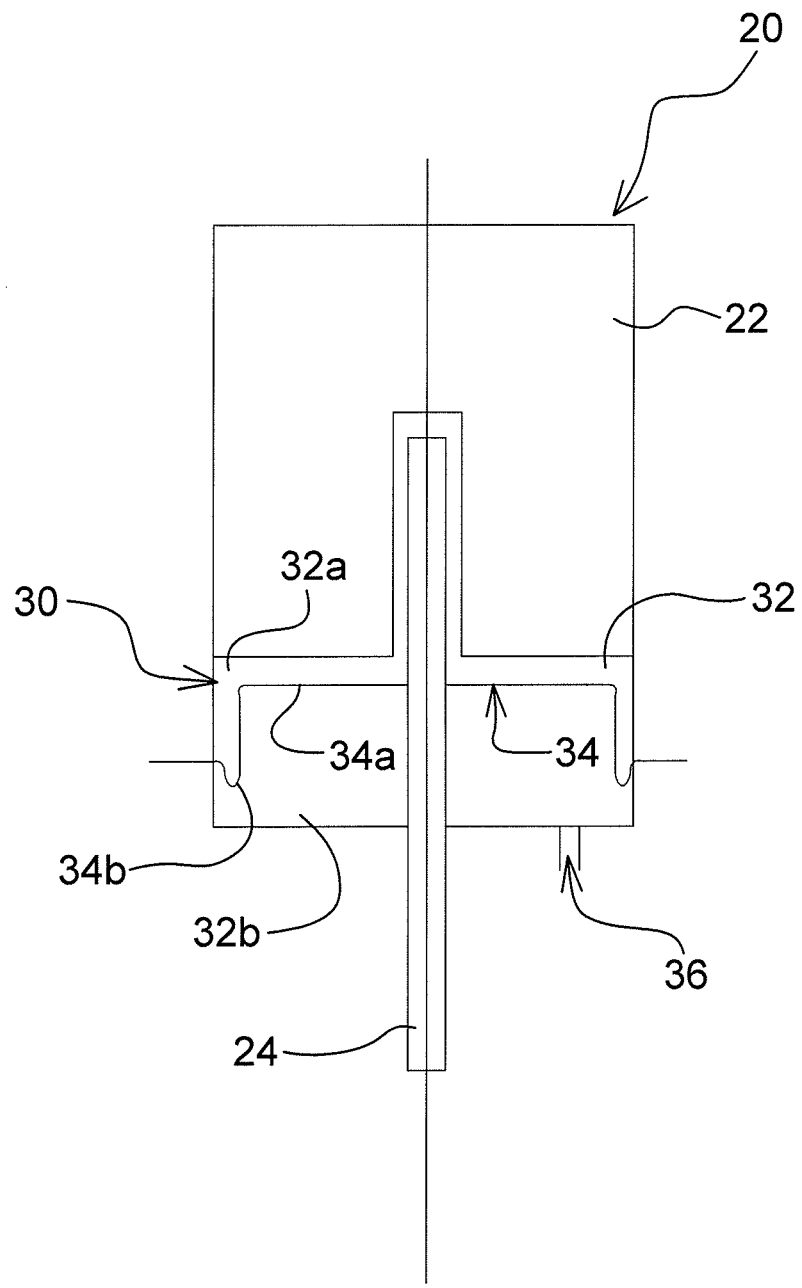
FIG. 4 is a schematic depiction of an electro-pneumatic actuator in accordance with an embodiment of the invention.

With reference to FIG. 4, a schematic depiction of the electro-pneumatic actuator 20 illustrates that the pneumatic device 30 comprises a pneumatic chamber 32 and a piston 34 disposed in the pneumatic chamber and arranged for movement in the pneumatic chamber substantially along the longitudinal direction defined by the axis of the shaft 24. The actuator shaft extends through a passage defined in the pneumatic chamber, and the pneumatic chamber is sealed with respect to the actuator shaft. The piston is affixed to the actuator shaft such that the actuator shaft and the piston move together as a unit. The pneumatic device also includes a port 36 into the pneumatic chamber for feeding a gas into the pneumatic chamber or exhausting the gas therefrom so as to exert a pressure force on the piston 34 and thereby provide a pneumatic assist to the force exerted on the actuator shaft by the motor 22.

As depicted, the piston 34 can comprise a substantially rigid disc portion 34a rigidly affixed to the actuator shaft 24, the rigid portion having an outer periphery, and a flexible diaphragm 34b attached to the rigid portion and having a peripheral portion that extends beyond the outer periphery of the rigid portion and is sealingly attached to an inner surface of the pneumatic chamber 32. The piston divides the pneumatic chamber into a first sub-chamber 32a and a second sub-chamber 32b, wherein the port 36 communicates with the second sub-chamber 32b.

Pneumatic energy for the pneumatic device 30 can be provided by a line 38 that taps compressor discharge air and supplies it through the port 36 into the second sub-chamber 32b of the pneumatic device. In the system shown in FIG. 1, the line 38 is always open and so the pneumatic device is always in communication with compressor discharge pressure (P2C). Thus, when P2C is high, the pneumatic device would apply a relatively large pneumatic assist force to the shaft 24; when P2C is low, a relatively low pneumatic assist force would be provided. This is generally in keeping with the need for pneumatic assist force, since the greatest assist is generally needed when there are the largest exhaust gas pressure forces exerted on the waste gate 18, which tends to be at operating conditions where P2C is high; conversely, the forces exerted on the waste gate by the exhaust gases are relatively low at conditions where P2C is low. Accordingly, the system shown in FIG. 1 is a particularly simple system in that no regulation of the compressor discharge air to the pneumatic device 30 is required.

Figure 2:
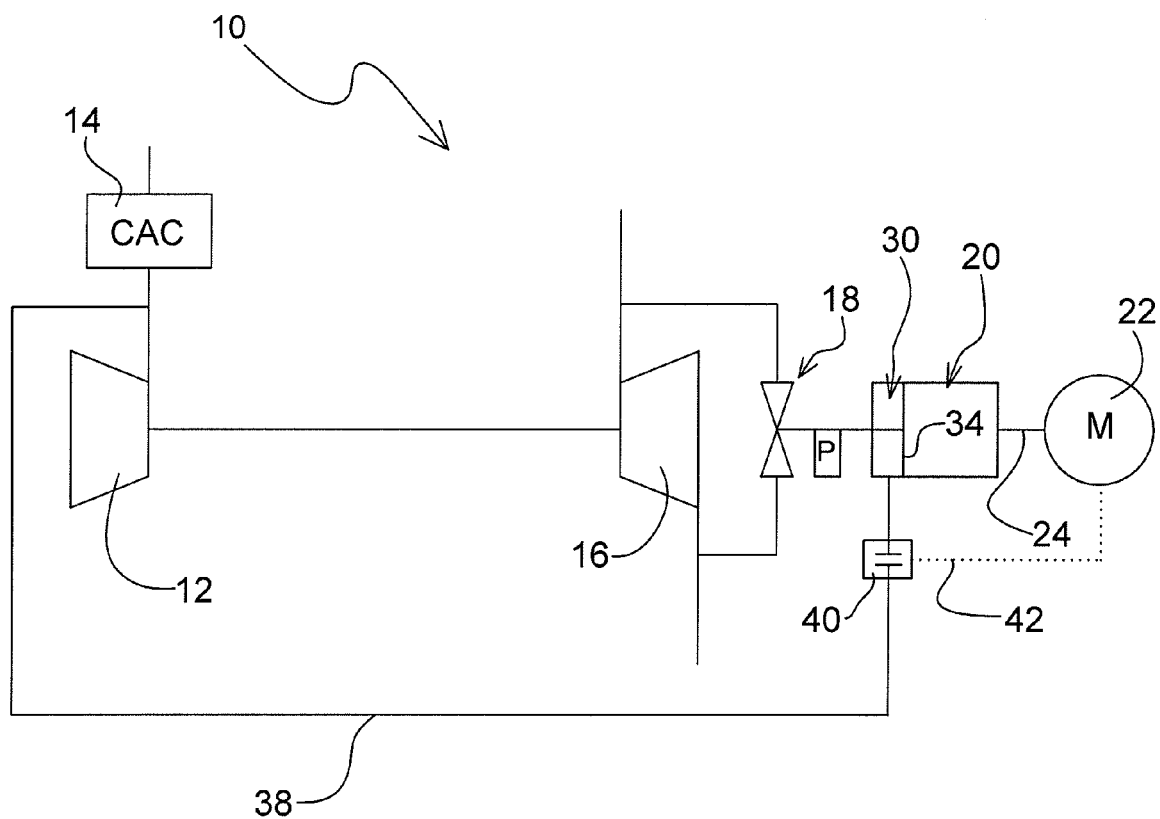
FIG. 2 is a schematic depiction of a turbocharger with an electro-pneumatic actuator system in accordance with another embodiment.

On the other hand, there may be situations where it is desired to regulate the supply of pressurized air to the pneumatic device 30. FIG. 2 depicts an alternative system in which there is a controllable on-off valve 40 in the line 38 from the compressor discharge to the pneumatic device 30. In this embodiment the electric actuator can be operable for providing a position signal indicative of a position of the actuator shaft 24 with respect to end points of a full stroke of the actuator shaft, and the valve 40 can be opened only when the shaft position is within a specified range. Thus, pneumatic assist can be provided (by opening the valve 40) for only certain parts of the stroke of the actuator shaft. For example, the valve may be opened only when the shaft position indicates the waste gate 18 is closed or nearly closed. Control signal 42 is shown in FIG. 2, denoting the signal that opens or closes the valve 40 depending on the indicated shaft position.

Figure 3:
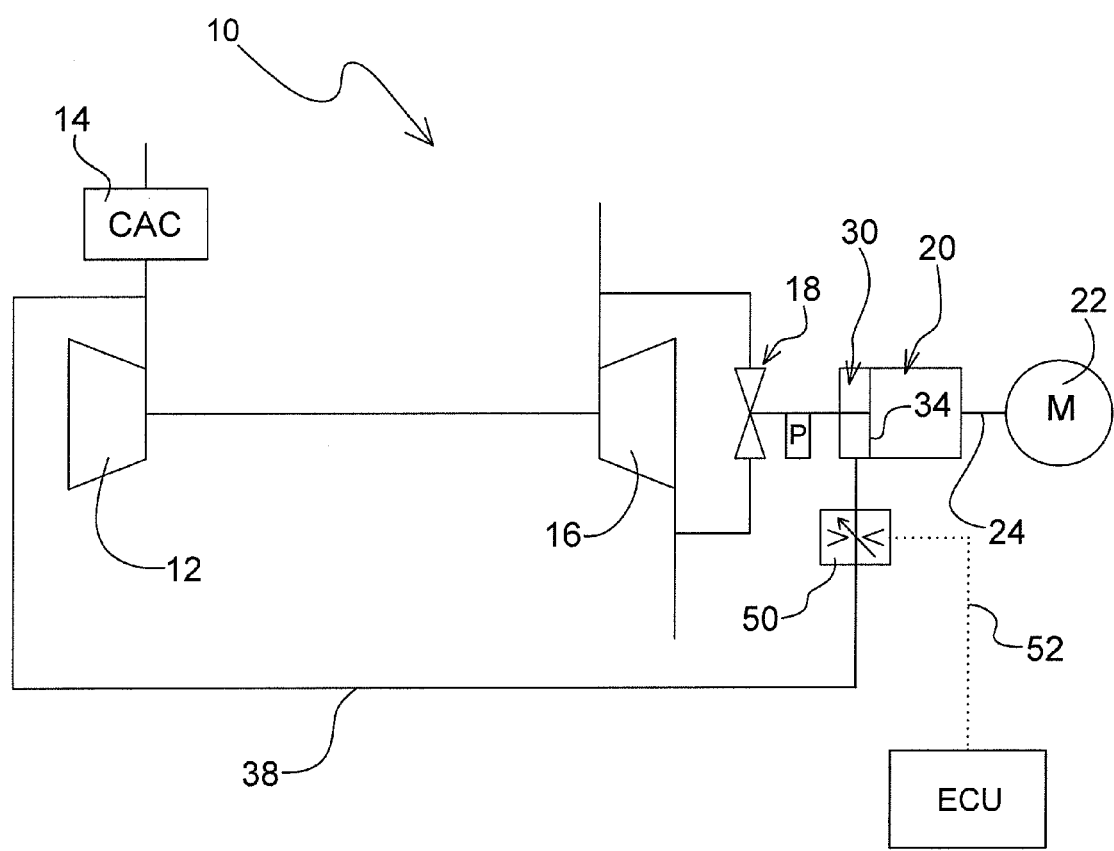
FIG. 3 is a schematic depiction of a turbocharger with an electro-pneumatic actuator system in accordance with yet another embodiment.

FIG. 3 depicts yet another system in which there is a modulating control valve 50 for regulating the compressor discharge air supplied through the line 38 to the pneumatic device. The valve 50 is not a simple on-off valve, but rather has the ability to modulate the size of the passage through the valve so as to regulate the amount of pressure drop across the valve and thus the amount of pneumatic assist force provided by the pneumatic device. The controllable valve 50 can be controlled by a signal 52 from the Engine Control Unit (ECU).

The electro-pneumatic actuator 20 as described herein can provide significant benefits to waste gate control, relative to a pneumatic actuator, by greatly reducing hysteresis, increasing controllability, and reducing response times. It can also improve on a purely electric actuator. A significant drawback of an electric actuator is that the electric motor is not efficient at providing a continuous force in a static or stall condition for the motor. Pneumatic systems (pressure or vacuum) on the other hand, can produce large amounts of force both dynamically and statically, and do not suffer from internal heating as an electric motor does, which makes them very well adapted at providing continuous forces. Additionally, when a pneumatic system holds a force in a fixed position, no work is being done, and therefore no energy is being consumed, contrary to an electric system that requires a significant current draw to generate torque or force.

The electro-pneumatic actuator 20 of the present invention combines the virtues of an electric actuator with those of a pneumatic actuator. By combining the respective advantages, the motor 22 of the electric actuator can be sized according to the primary need, which is to provide enough transient (peak) torque to move the waste gate through its stroke with sufficient margin to facilitate fast response time. The motor does not, however, need to be oversized (typically by a factor of 2) to accommodate the continuous holding torque (stall torque), because this energy is provided by the pneumatic assist.

The pneumatic assist is provided to the electric actuator by pneumatic device that uses the compressor boost pressure (P2C) as a "free" energy source. As the P2C is available directly from the compressor, there is no external energy source required for the customer.

A typical continuous current limit of the ECU is approximately 2 A, which on a 12V system represents 24 W of electrical power that would be required to hold a waste gate closed. In order for an electric motor to generate sufficient force to close a waste gate, all of the 2 amps is typically required. If this force can be, in large part, achieved by static pressure from the compressor instead of electrical power, then the electro-pneumatic system could save nearly 24 W of electrical power when the waste gate is closed. Additionally, as the P2C is proportional to the turbine delta P, the pneumatic assist is providing force only when it is actually required, as large closing forces are required only when the turbine delta-P is high (and the turbine is doing work). This means that the pneumatic assist would effectively remove the elevated force requirement of the waste gate system, allowing the electric motor to actuate the waste gate with a significantly reduced force requirement. The pneumatic assist is beneficial not only at the waste gate closing position, but potentially throughout the stroke of the actuator.

As an example, if the engine is at idle and the waste gate is commanded closed, the force required to do so is not particularly high, as there is very little flow through the turbine and the turbine delta-P is low. Since the turbine does not extract much work from the exhaust gas, little work is transferred to the compressor, and therefore the P2C of the compressor is not large. Small P2C means that the pneumatic assist is not providing much assistance, but in this case, no assistance was necessary. The electric motor can then easily handle the task of closing the waste gate. For the opposite case, when the engine is under full load, and the waste gate is commanded closed, the forces required to do so are very large. Under this condition of high engine load, the turbine is extracting significant energy from the gas (which is the reason for the high closing force requirement), and transferring this energy to the compressor. The compressor is generating boost for the engine, so by necessity, the P2C is high. In this case the pneumatic assist is providing significant assistance to the electric actuator, meaning that the electric motor needs to provide only a fraction of the overall force required.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An electro-pneumatic actuator for a turbocharger waste gate, comprising:

an actuator shaft having a first end and a second end and defining an axis extending between the first and second ends, the second end being arranged for connection to a waste gate;

an electric actuator coupled to the actuator shaft, the electric actuator being structured and arranged to exert a force on and impart linear motion to the actuator shaft along a direction defined by the axis, for advancing and retracting the actuator shaft so as to adjust a position of the waste gate;

a pneumatic chamber defining a passage extending therethrough, the actuator shaft extending through the passage, the pneumatic chamber being sealed with respect to the actuator shaft;

a piston disposed in the pneumatic chamber and arranged for movement in the pneumatic chamber along said direction, the piston being affixed to the actuator shaft such that the actuator shaft and the piston move together as a unit;

a port into the pneumatic chamber for feeding a gas into the pneumatic chamber or exhausting the gas therefrom so as to exert a pressure force on the piston and thereby provide a pneumatic assist to the force exerted on the actuator shaft; and a valve in communication with the port for selectively controlling the gas fed into or exhausted from the pneumatic chamber, wherein the electric actuator is operable for providing a position signal indicative of a position of the actuator shaft with respect to end points of a full stroke of the actuator shaft, and the pneumatic assist is provided for only certain parts of the stroke of the actuator shaft.

2. The electro-pneumatic actuator of claim 1, wherein the piston includes a rigid portion rigidly affixed to the actuator shaft, the rigid portion having an outer periphery, and a flexible diaphragm attached to the rigid portion and having a peripheral portion that extends beyond the outer periphery of the rigid portion and is sealingly attached to an inner surface of the pneumatic chamber, the piston dividing the pneumatic chamber into a first sub-chamber and a second sub-chamber, wherein the port communicates with the second sub-chamber.

3. The electro-pneumatic actuator of claim 1, wherein the valve comprises a modulating control valve for selectively controlling the gas fed into or exhausted from the pneumatic chamber.

4. The electro-pneumatic actuator of claim 1, wherein the valve comprises an on-off valve.

5. The electro-pneumatic actuator of claim 4, wherein the on-off valve is arranged for receiving an external signal from an engine control unit for activating the pneumatic assist.

6. A turbocharger comprising:
a compressor and a turbine, the turbine having a turbine housing that receives exhaust gas from an internal combustion engine and supplies the exhaust gas to a turbine wheel that is connected to a compressor wheel of the compressor, the turbine further comprising a waste gate that in a closed position allows all of the exhaust gas to pass through the turbine wheel and that in any of various open or partially open positions allows some of the exhaust gas to bypass the turbine wheel; and
an electro-pneumatic actuator for the waste gate, comprising:
an actuator shaft having a first end and a second end and defining an axis extending between the first and second ends, the second end being arranged for connection to a waste gate;
an electric actuator coupled to the actuator shaft, the electric actuator being structured and arranged to exert a force on and impart linear motion to the actuator shaft along a direction defined by the axis, for advancing and retracting the actuator shaft so as to adjust a position of the waste gate;
a pneumatic chamber defining a passage extending therethrough, the actuator shaft extending through the passage, the pneumatic chamber being sealed with respect to the actuator shaft;
a piston disposed in the pneumatic chamber and arranged for movement in the pneumatic chamber along said direction, the piston being affixed to the actuator shaft such that the actuator shaft and the piston move together as a unit;
a port into the pneumatic chamber for feeding a gas into the pneumatic chamber or exhausting the gas therefrom so as to exert a pressure force on the piston and thereby provide a pneumatic assist to the force exerted on the actuator shaft; and
a valve in communication with the port for selectively controlling the gas fed into or exhausted from the pneumatic chamber,
wherein the electric actuator is operable for providing a position signal indicative of a position of the actuator shaft with respect to end points of a full stroke of the actuator shaft, and the pneumatic assist is provided for only certain parts of the stroke of the actuator shaft.

7. The turbocharger of claim 6, wherein the piston includes a rigid disc portion rigidly affixed to the actuator shaft, the disc portion having an outer periphery, and a flexible diaphragm attached to the disc portion and having a peripheral portion that extends beyond the outer periphery of the disc portion and is sealingly attached to an inner surface of the pneumatic chamber, the piston dividing the pneumatic chamber into a first sub-chamber and a second sub-chamber, wherein the port communicates with the second sub-chamber.

8. The turbocharger of claim 6, wherein the valve comprises an on-off valve.

9. The turbocharger of claim 6, wherein the valve comprises a modulating control valve.

10. A method for regulating a position of a waste gate of a turbocharger, comprising the steps of:
providing a turbocharger comprising a compressor and a turbine, the turbine having a turbine housing that receives exhaust gas from an internal combustion engine and supplies the exhaust gas to a turbine wheel that is connected to a compressor wheel of the compressor, the turbine further comprising a waste gate that in a closed position allows all of the exhaust gas to pass through the turbine wheel and that in any of various open or partially open positions allows some of the exhaust gas to bypass the turbine wheel;
providing an actuator shaft having a first end and a second end and defining an axis extending between the first and second ends, the second end being connected to the waste gate;
using an electric actuator to impart movement to the actuator shaft along the axis so as to move the waste gate from one of the open or partially open positions toward the closed position; and
when the waste gate is in the closed position, exerting a pneumatic assist force on the actuator shaft to hold the waste gate in the closed position and deactivating the electric actuator, wherein the pneumatic assist force is exerted by a pneumatic actuator coupled to the actuator shaft, the pneumatic actuator comprising a pneumatic chamber having a piston disposed therein, the piston being affixed to the actuator shaft, and a port being defined in the pneumatic chamber for feeding a gas into the pneumatic chamber or exhausting the gas therefrom so as to exert a pressure force on the piston and thereby provide the pneumatic assist force exerted on the actuator shaft, and further comprising:
controlling the gas fed into or exhausted from the pneumatic chamber with a valve in communication with the port, wherein the electric actuator provides a position signal indicative of a position of the actuator shaft with respect to end points of a full stroke of the actuator shaft, and the pneumatic assist force is provided for only certain parts of the stroke of the actuator shaft.

11. The method of claim 10, wherein the pneumatic assist force is provided only when the position of the actuator shaft is within a predetermined tolerance of a position corresponding to the closed position of the waste gate.

12. The method of claim 10, wherein the valve receives an external signal from an engine control unit for activating the pneumatic assist force.

13. The method of claim 10, wherein the valve comprises a modulating control valve, and further comprising selectively controlling the gas fed into or exhausted from the pneumatic chamber using the modulating control valve.

* * * * *